United States Patent
Kojima et al.

(10) Patent No.: US 8,618,792 B2
(45) Date of Patent: Dec. 31, 2013

(54) ROTATION ANGLE DETECTION DEVICE, AND ROTATION ANGLE DETECTION METHOD

(75) Inventors: Hiroyoshi Kojima, Nishio (JP);
Masashi Mure, Toyota (JP); Hisashi Nishikawa, Ika-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 247 days.

(21) Appl. No.: 13/122,759

(22) PCT Filed: Sep. 29, 2009

(86) PCT No.: PCT/IB2009/006977
§ 371 (c)(1),
(2), (4) Date: Apr. 6, 2011

(87) PCT Pub. No.: WO2010/041111
PCT Pub. Date: Apr. 15, 2010

(65) Prior Publication Data
US 2011/0199075 A1    Aug. 18, 2011

(30) Foreign Application Priority Data
Oct. 6, 2008  (JP) .................................. 2008-259975

(51) Int. Cl.
*G01B 7/30* (2006.01)
(52) U.S. Cl.
USPC ............ 324/207.25; 324/207.11; 324/207.22; 324/207.23; 324/245; 324/167; 702/145; 702/147; 702/151; 702/163; 73/862.331; 73/862.326
(58) Field of Classification Search
USPC .................................................... 324/207.25
See application file for complete search history.

(56) References Cited

U.S. PATENT DOCUMENTS 5,930,905 A * 8/1999 Zabler et al. .................. 33/1 PT
7,040,025 B2 * 5/2006 Inoue ............................ 33/1 PT
(Continued)

FOREIGN PATENT DOCUMENTS

EP    1 783 036    5/2007
JP    2004 507722    3/2004
(Continued)

OTHER PUBLICATIONS

International Search Report issued May 27, 2010 in PCT/IB09/06977 filed Sep. 29, 2009.

(Continued)

*Primary Examiner* — Tung X Nguyen
*Assistant Examiner* — Thang Le
(74) *Attorney, Agent, or Firm* — Oblon, Spivak, McClelland, Maier & Neustadt, L.L.P.

(57) ABSTRACT

A rotation angle detection device includes: a detection portion that detects detection angle that univocally corresponds to rotation angle of a rotating body which is within a predetermined range, wherein the detection angle linearly increases from a minimum value to a maximum value as the rotation angle increases within a unit range, and the detection angle changes from the maximum value to the minimum value or from the minimum value to the maximum value at a boundary between unit ranges that are adjacent to each other; and a correction portion that corrects the detection angle so that the detection angle detected in the predetermined range has linear characteristics, if the boundary between the unit ranges is contained in the predetermined range.

8 Claims, 7 Drawing Sheets

(56) References Cited

U.S. PATENT DOCUMENTS

| | | | |
|---|---|---|---|
| 7,200,515 B2 * | 4/2007 | Sakabe et al. | 702/151 |
| 7,447,579 B2 * | 11/2008 | Lee | 701/41 |
| 7,532,005 B2 * | 5/2009 | Arakawa et al. | 324/207.25 |
| 8,047,066 B2 * | 11/2011 | Kang et al. | 73/117.02 |
| 8,283,917 B2 * | 10/2012 | Sano | 324/207.25 |
| 8,290,664 B2 * | 10/2012 | Collet et al. | 701/42 |
| 8,326,570 B2 * | 12/2012 | Waite et al. | 702/151 |
| 2002/0097044 A1 * | 7/2002 | Tateishi et al. | 324/207.21 |
| 2002/0113201 A1 | 8/2002 | McAllister et al. | |
| 2003/0056583 A1 * | 3/2003 | Schodlbauer et al. | 73/200 |
| 2003/0217607 A1 * | 11/2003 | Tokumoto et al. | 73/862.191 |
| 2004/0145364 A1 * | 7/2004 | Onishi et al. | 324/207.2 |
| 2004/0244772 A1 * | 12/2004 | Ikeda et al. | 123/399 |
| 2006/0152214 A1 * | 7/2006 | Hatano | 324/207.25 |
| 2007/0102226 A1 * | 5/2007 | Matsuda | 180/400 |
| 2007/0103147 A1 * | 5/2007 | Kondo et al. | 324/207.25 |
| 2007/0229063 A1 * | 10/2007 | Shiraga et al. | 324/207.25 |
| 2009/0058405 A1 * | 3/2009 | Oike et al. | 324/207.25 |

FOREIGN PATENT DOCUMENTS

| | | |
|---|---|---|
| JP | 2004 168191 | 6/2004 |
| JP | 2004 353683 | 12/2004 |
| JP | 2007 127609 | 5/2007 |

OTHER PUBLICATIONS

Office Action issued Aug. 30, 2010, in Japan Patent Application 2008-259975, filed Sep. 6, 2008 (with English-language translation).

* cited by examiner

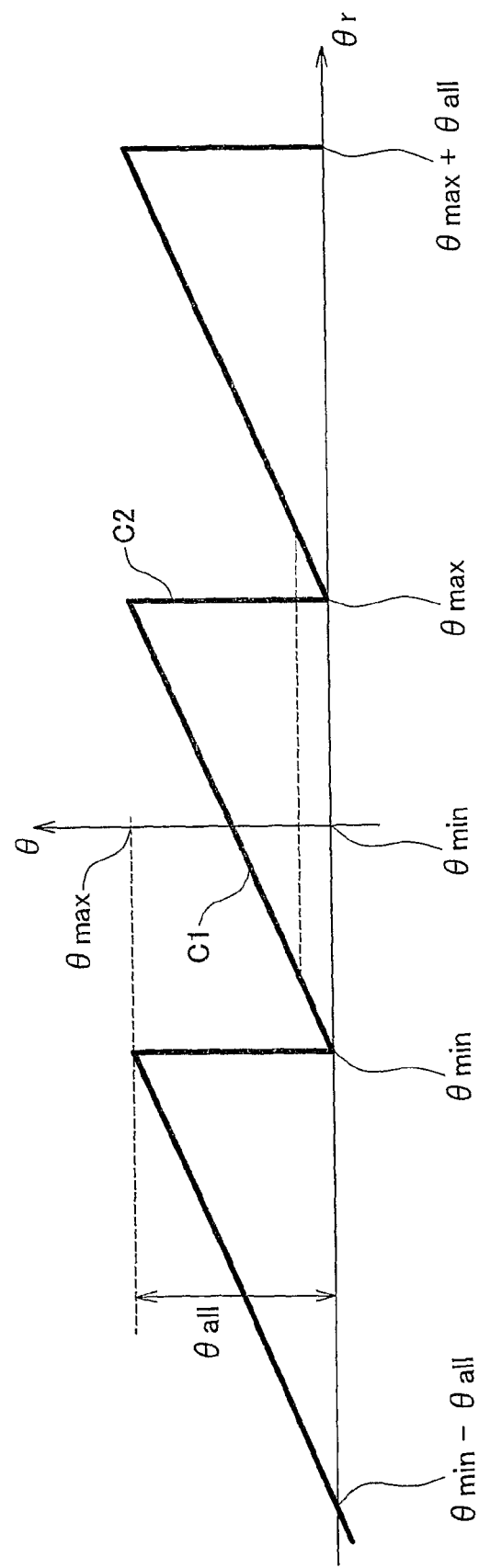

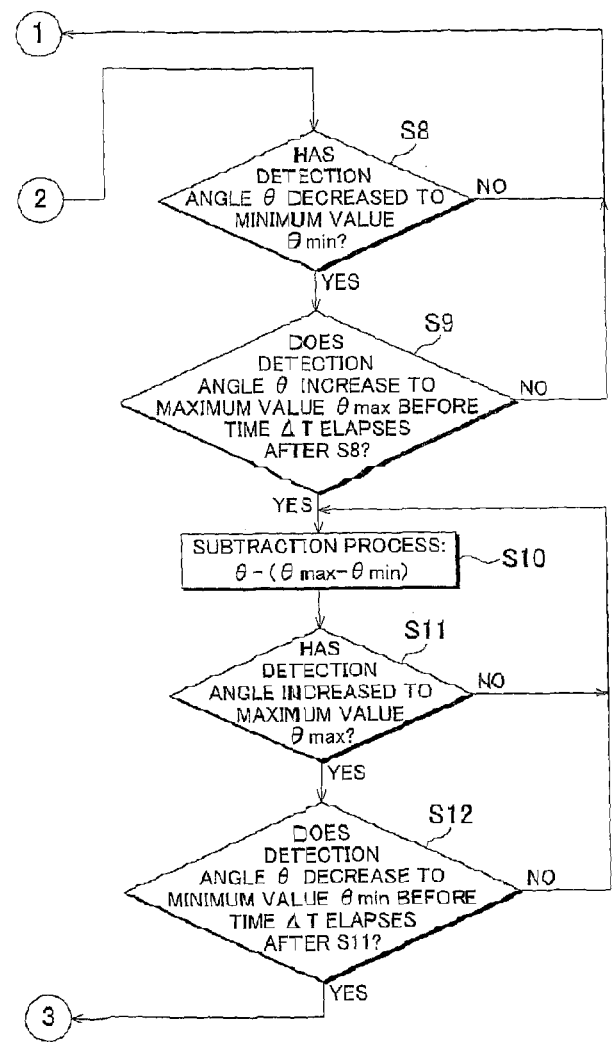

ROTATION ANGLE DETECTION DEVICE, AND ROTATION ANGLE DETECTION METHOD

BACKGROUND OF THE INVENTION

1. Field of the Invention

The invention relates to a rotation angle detection device and a rotation angle detection method that are applied to vehicles such as passenger automobiles, trucks, buses, etc.

2. Description of the Related Art

As a rotation angle detection device that detects the rotation angle of a steering wheel of a motor vehicle, that is, the steering angle, an absolute angle sensor type device as described in Japanese Patent Application Publication No. 2007-127609 (JP-A-2007-127609) has been disclosed. This type of rotation angle detection device includes a main gear that is pivoted integrally with a column main shaft coupled to a steering wheel, two detection gears that are meshed with the main gear, and that each have a built-in magnet and that have different numbers of teeth, two magnetic resistance elements that face the magnets and that each magnetically detect the rotation angle of a corresponding one of the two detection gears, and a microcomputer that computes and detects the rotation angle of the steering wheel from the output waveforms of the magnetic resistance elements.

In this rotation angle detection device, the numbers of teeth of the two detection gears are different from each other, so that the periods of the detection waveforms of the two magnetic resistance elements are deviated from each other. On the basis of the detected waveforms, detection angle is computed. Therefore, it is possible to detect the detection angle that univocally corresponds to the rotation angle, in a relatively broad unit range of angle rotation.

However, the foregoing rotation angle detection device described in Japanese Patent Application Publication No. 2007-127609 (JP-A-2007-127609) has a problem as follows. That is, in the case where the range of the rotation angle that is a detection object of the column main shaft deviates from the unit range of the rotation angle detection device, that is, in the case where a mounting error occurs, the detection angle that univocally corresponds to the rotation angle cannot be detected without going through the mounting operation again, and therefore a cost increase will result.

SUMMARY OF THE INVENTION

The invention provides a rotation angle detection device capable of univocally detecting detection angle that corresponds to the rotation angle while achieving sufficient cost reduction.

A first aspect of the invention is a rotation angle detection device that includes: a detection portion that detects detection angle that univocally corresponds to rotation angle of a rotating body which is within a predetermined range, wherein the detection angle linearly increases from a minimum value to a maximum value as the rotation angle increases within a unit range, and the detection angle changes from the maximum value to the minimum value or from the minimum value to the maximum value at a boundary between unit ranges that are adjacent to each other; and a correction portion that corrects the detection angle so that the detection angle detected in the predetermined range has linear characteristics, if the boundary between the unit ranges is contained in the predetermined range.

In the first aspect, the correction portion may start an addition process of adding to the detection angle a value obtained by subtracting the minimum value from the maximum value, if the detection angle decreases to the minimum value immediately after increasing to the maximum value.

The foregoing unit range is a range of angle in which the detection angle that is realized by making the numbers of teeth of the two detecting gears different from each other and that univocally corresponds to the rotation angle can be detected, for example, in the case where the foregoing detection portion is realized by the related-art technique described in Japanese Patent Application Publication No. 2007-127609 (JP-A-2007-127609). If the rotation angle is represented by the horizontal axis and the detection angle is represented by the vertical axis in a graph, a plurality of unit ranges are juxtaposed repeatedly in the direction of the horizontal axis, corresponding to the increase or decrease of the rotation angle of the rotating body. In addition, the term "univocally" indicates that only one detection angle is determined for a given rotation angle within the unit range.

It is essential that a characteristic curve that shows a relation between the rotation angle and the detection angle along the horizontal axis and the vertical axis include a rightward rising linear portion on which the detection angle assumes the minimum value at the extreme decrease-side end of the unit range, and assumes the maximum value at the extreme increase-side end of the unit range, and be linear in each unit range. Besides, the characteristic curve includes, at a boundary between every two adjacent unit ranges, a perpendicular portion that is perpendicular or substantially perpendicular to the horizontal axis which connects the increase-side end of a linear portion and the decrease-side end of the other linear portion that is adjacent to the increase side of the linear portion. That is, the characteristic curve has a sawtooth shape which has triangular waves that contiguously appear in the horizontal axis direction, and which therefore changes periodically every unit range.

According to this construction, in the case where the detection angle decreases to the minimum value immediately after increasing to the maximum value although the rotation range of the rotating body is set to a width that is within the unit range, it can be considered that there is a so-called mis-mounting such that the rotation range is offset or deviated from the unit range to the increase side. The detection angle after decreasing from the maximum value to the minimum value can be processed as follows. That is, by adding to the detection angle a value obtained by subtracting the minimum value from the maximum value, the detection angle in a portion of the rotation range that extends out from the unit range to the increase side can be caused to agree with the linear characteristics of the detection angle in the portion of the rotation range that does not extend out from the unit range.

Accordingly, the detection angle that univocally corresponds to the rotation angle can be detected over the entire rotation range. Therefore, even in the case where there is mis-mounting, the rotation angle detection device can be used without a need to perform the mounting operation again. This will reduce the production cost.

The correction portion may end the addition process if the detection angle increases to the maximum value immediately after decreasing to the minimum value.

According to this construction, performance of the addition process can be omitted for the detection angle in the portion of the rotation range that is located within the unit range and therefore does not require the detection angle to be subjected to the addition process.

Furthermore, the rotation angle detection device may further include a notification portion that notifies that mis-mounting has occurred, if the correction portion starts the addition process.

According to this construction, the occurrence of mis-mounting can be notified to the control device that performs control using the detection angle detected by the rotation angle detection device, so that correction of the detection angle can be performed, for example, at timing at which the control device receives the notification.

Incidentally, the foregoing rotation angle detection device is constructed so as to cope with the case where the rotation range is offset or deviated from the unit range to the increase side. Conversely, in the case where the rotation range is offset or deviated from the unit range to the decrease side, the rotation angle detection device may include a construction as follows.

In the first aspect, the correction portion may start a subtraction process of subtracting from the detection angle a value obtained by subtracting the minimum value from the maximum value, if the detection angle increases to the maximum value immediately after decreasing to the minimum value.

According to this construction, in the case where the detection angle increases to the maximum value immediately after decreasing to the minimum value although the rotation range of the rotating body is set to a width that is within the unit range, it can be considered that there is a so-called mis-mounting such that the rotation range is offset or deviated from the unit range to the decrease side. The detection angle after increasing from the minimum value to the maximum value can be processed as follows. That is, by subtracting from the detection angle a value obtained by subtracting the minimum value from the maximum value, the detection angle in a portion of the rotation range that extends out from the unit range to the decrease side can be caused to agree with the linear characteristics of the detection angle in the portion of the rotation range that does not extend out from the unit range.

Accordingly, the detection angle that univocally corresponds to the rotation angle can be detected over the entire rotation range. Therefore, even in the case where there is mis-mounting, the rotation angle detection device can be used without a need to perform the mounting operation again. This will reduce the production cost.

The correction portion may end the subtraction process if the detection angle decreases to the minimum value immediately after increasing to the maximum value.

According to this construction, performance of the subtraction process can be omitted for the detection angle in the portion of the rotation range that is located within the unit range and therefore does not require the detection angle to be subjected to the subtraction process.

Furthermore, the rotation angle detection device may further include a notification portion that notifies that mis-mounting has occurred, if the correction portion starts the subtraction process.

According to this construction, the occurrence of mis-mounting can be notified to the control device that performs control using the detection angle detected by the rotation angle detection device, so that correction of the detection angle can be performed, for example, at timing at which the control device side receives the notification.

Furthermore, as a technique of coping with the mis-mounting as described above, it is conceivable that the numbers of teeth of the two detecting gears are made greatly different from each other so that the unit range is a broad range given an increased margin with respect to the rotation range, in the case where the detection portion is realized by the related-art described in Japanese Patent Application Publication No. 2007-127609 (JP-A-2007-127609). However, in this case, it is inevitable to increase the outside diameter of one of the two detecting gears. This will give rise to a problem of bringing about an increased weight of the rotation angle detection device as a whole, an enlarged outside dimension, and an increased cost.

According to the first aspect of the invention, the rotation angle detection device can eliminate the need to change the numbers of teeth of the detecting gears, and therefore can substantially avoid bringing about an increased weight, an enlarged outside dimension, or an increased cost of the rotation angle detection device.

According to the first aspect of the invention, it is possible to eliminate the need to perform the mounting operation again when mis-mounting occurs, and therefore to achieve a sufficient cost reduction, and to univocally detect the detection angle that corresponds to the rotation angle.

A second aspect of the invention is a rotation angle detection method that includes: detecting detection angle that univocally corresponds to rotation angle of a rotating body which is within a predetermined range, wherein the detection angle linearly increases from a minimum value to a maximum value as the rotation angle increases within a unit range, and the detection angle changes from the maximum value to the minimum value or from the minimum value to the maximum value at a boundary between unit ranges that are adjacent to each other; and correcting the detection angle so that the detection angle detected in the predetermined range has linear characteristics, if the boundary between the unit ranges is contained in the predetermined range.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a schematic diagram showing a relation between the detection angle detected by the rotation angle detection device in accordance with the embodiment of the invention and the rotation angle;

FIGS. 3A and 3B is a flowchart showing a content of a control of the rotation angle detection device in accordance with an embodiment of the invention;

DETAILED DESCRIPTION OF EMBODIMENTS

Figure 1:
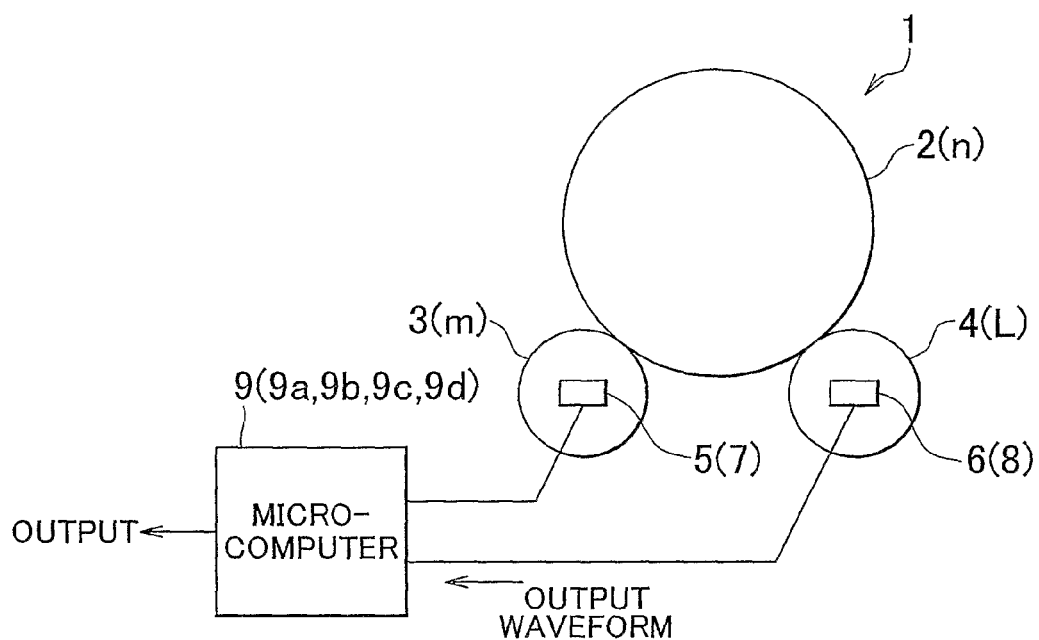
FIG. 1 is a schematic diagram showing a rotation angle detection device in accordance with an embodiment of the invention.

Embodiments for carrying out the invention will be described hereinafter with reference to the accompanying drawings. FIG. 1 is a schematic diagram showing a rotation angle detection device in accordance with an embodiment of the invention. Incidentally, the construction of this rotation angle detection device is well-known as described in Japanese Patent Application Publication No. 2007-127609 (JP-A-2007-127609). Therefore, in conjunction with this application, only component elements related to the invention are shown in the drawings, and other component elements are omitted from the drawings, and the descriptions of computations and detection principles is also omitted.

A rotation angle detection device 1 of this embodiment includes a main gear 2, a detecting gear 3, a detecting gear 4, a magnet 5, a magnet 6, a magnetic resistance element 7, a magnetic resistance element 8, and a microcomputer 9 as shown in FIG. 1.

The main gear 2 is drivingly coupled to a column main shaft of a steering device, and an outer periphery thereof has n number of teeth. The detecting gear 3 is meshed with the main gear 2, and is freely rotatably supported thereon. An outer periphery of the detecting gear 3 has m number of teeth. Besides, the detecting gear 4 is also meshed with the main gear 2, and is freely rotatably supported thereon. An outer periphery of the detecting gear 4 has L number of teeth. Incidentally, n, m and L are natural numbers, and m≠L, m<n, and L<n.

The magnet 5 is constructed to have a thin-walled flat plate shape, and is disposed on an end surface of the detecting gear 3 in the axis direction, with the polarity thereof being in a radial direction of the detecting gear 3. Similarly, the magnet 6 is constructed to have a thin-walled flat plate shape, and is disposed on an end surface of the detecting gear 4 in the axis direction, with the polarity thereof being in a radial direction of the detecting gear 4.

The magnetic resistance element 7 is disposed facing the end surface of the detecting gear 3 in the axis direction on which the magnet 5 is disposed. The magnetic resistance element 7 outputs to the microcomputer 9 an output waveform that changes with rotation of the detecting gear 3. Similarly, the magnetic resistance element 8 is disposed facing the end surface of the detecting gear 4 in the axis direction on which the magnet 6 is disposed. The magnetic resistance element 8 outputs to the microcomputer 9 an output waveform that changes with rotation of the detecting gear 4.

The microcomputer 9 is constructed of, for example, a CPU, a ROM, a RAM, a data bus that connects those components, and input/output interfaces. The microcomputer 9 forms a detection portion 9a in which the CPU, following programs stored in the ROM, computes and thereby detects sawtooth detection angle θ having a minimum value θmin and a maximum value θmax by a method described in Japanese Patent Application Publication No. 2007-127609 (JP-A-2007-127609), on the basis of the two output waveforms input from the magnetic resistance element 7 and the magnetic resistance element 8. The microcomputer 9 also forms a correction portion 9b, an output portion 9c, and a notification portion 9d that perform predetermined processes described below.

The detection portion 9a detects the detection angle θ that univocally corresponds to the rotation angle θr of the column main shaft (not shown), that is, of a rotating body, in every unit range that is determined by the minimum value θmin and the maximum value θmax. The unit ranges can be represented by θmin≤θ≤θmax, and θmin±i×θall≤θ≤θmax±i×θall (i is a natural number), where θall is a value obtained by subtracting the minimum value θmin from the maximum value θmax.

Hereinafter, a characteristic curve showing a relation between the rotation angle θr and the detection angle θ will be described with reference to FIG. 2. FIG. 2 is a schematic diagram showing a relation between the detection angle and the rotation angle in a stage where the correction by the rotation angle detection device 1 concerned with this embodiment of the invention is not performed.

As shown in FIG. 2, in the unit range (θmin≤θ≤θmax, and θmin±i×θall≤θ≤θmax±i×θall), the characteristic curve has a rightward rising linear portion C1 in which the detection angle θ linearly increases from the minimum value θmin to the maximum value θmax as the rotation angle θr increases, and a perpendicular portion C2 in which the detection angle θ changes from the maximum value θmax to the minimum value θmin perpendicularly to the horizontal axis as the rotation angle θr increases, at the boundary between the present unit range and the adjacent unit range on the increase side of the present unit range. The linear portion C1 and the perpendicular portion C2 continuously alternate, forming a triangular wave every unit range. Therefore, the characteristic curve, as a whole, is a sawtooth curve that changes periodically every unit range as shown in FIG. 2. Incidentally, FIG. 2 shows a state in which the rotation angle detection device 1 has no mounting error with respect to the column main shaft.

For example, the minimum value θmin is 0 degree, and the maximum value θmax is 1620 degrees, and therefore the rotation of the column main shaft within 4.5 rotations can be detected in the unit range. That is, if the rotation range of the column main shaft is 4 rotations, the rotation of the column main shaft can be detected without exceeding the unit range of 4.5 rotations. However, if there is a mis-mounting of one rotation, it becomes necessary to perform an angle detection such that the unit range contains a range of five rotations of the column main shaft.

Therefore, the rotation range of the column main shaft, that is, a rotating body, is set to a predetermined range, that is, θmin≤θ≤θmax in this case. In the case where the detection angle θ decreases to the minimum value θmin immediately after the detection angle θ increases to the maximum value θmax, that is, within a predetermined time ΔT thereafter, then the correction portion 9b of the microcomputer 9 starts an addition process of adding to the detection angle θ the value θall that is obtained by subtracting the minimum value θmin from the maximum value θmax. In this case, the correction portion 9b ends this addition process in the case where the detection angle θ increases to the maximum value θmax immediately after decreasing to the minimum value θmin, that is, within the predetermined time ΔT thereafter. Incidentally, the predetermined time ΔT may be a computation period of the microcomputer 9 or an integer multiple of the computation period thereof.

In addition, the output portion 9c of the microcomputer 9 outputs a post-addition process detection angle θa, that is, a post-correction detection angle θ, to an electronic power steering electronic control unit (EPSECU) (not shown) when the correction portion 9b is performing the addition process, or outputs the detection angle θ to the EPSECU when the correction portion 9 is not performing the addition process. In the case where the correction portion 9b starts the addition process, the notification portion 9d of the microcomputer 9 notifies the EPSECU that a mis-mounting has occurred.

The characteristic curve shown in FIG. 2 has the following characteristics when the rotation angle θr decreases. That is, the characteristic curve has a characteristic that within the unit range the detection angle θ linearly decreases from the maximum value θmax to the minimum value θmin with the decreasing rotation angle θr, and the detection angle θ rapidly changes from the minimum value θmin to the maximum value θmax with the decreasing rotation angle θr, at the boundary between the present unit range and the adjacent unit range on the decrease side of the present unit range.

Correspondingly to this, the correction portion 9b of the microcomputer 9 starts a subtraction process of subtracting from the detection angle θ the value θall obtained by subtracting the minimum value θmin from the maximum value θmax, in the case where the detection angle θ increases to the maximum value θmax immediately after decreasing to the minimum value θmin, that is, within the predetermined time ΔT thereafter. In this case, too, the correction portion 9b ends this subtraction process in the case where the detection angle θ decreases to the minimum value θmin immediately after increasing to the maximum value θmax, that is, within the predetermined time θT thereafter.

Furthermore, the output portion 9c of the microcomputer 9 outputs a post-subtraction process detection angle θa, that is, a post-correction detection angle θa, to the EPSECU when the correction portion 9b is performing the subtraction process, or outputs the detection angle θ to the EPSECU when the correction portion 9b is not performing the subtraction process. When the correction portion 9b starts the subtraction process, the notification portion 9d of the microcomputer 9 notifies the EPSECU that a mis-mounting has occurred.

Figure 3A:
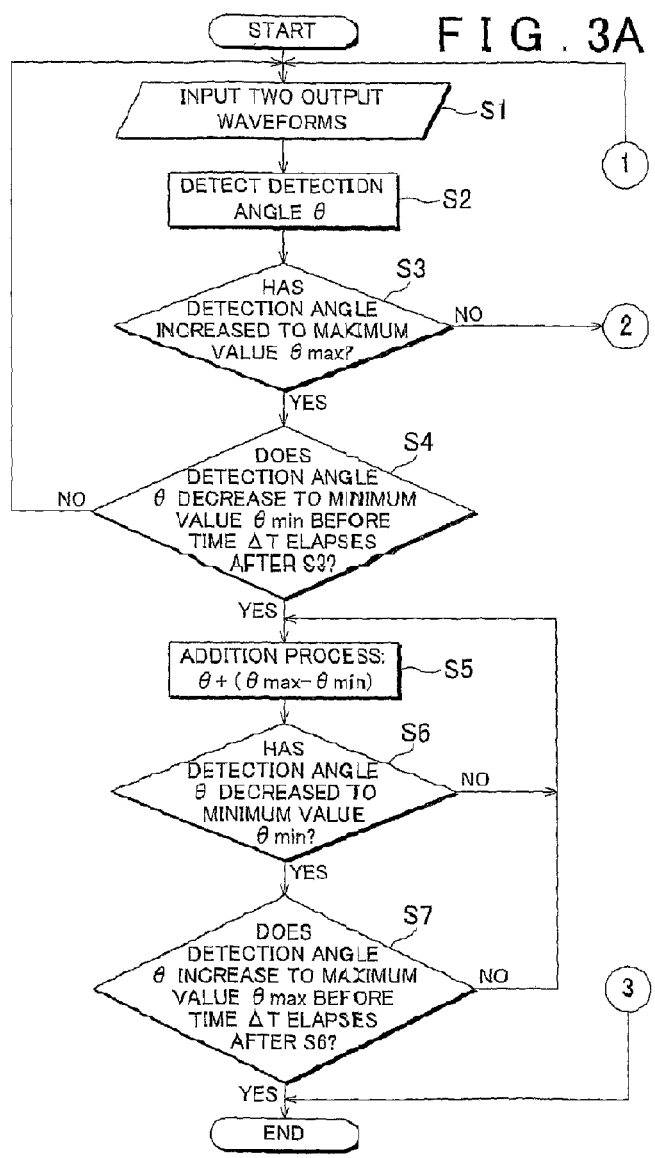

Hereinafter, a content of a control performed by the rotation angle detection device 1 in this embodiment will be described with reference to a flowchart. FIGS. 3A and 3B is a flowchart showing a content of a control performed by the rotation angle detection device 1 concerned with this embodiment.

As shown in S1 in FIG. 3A, the detection portion 9a of the microcomputer 9 acquires the output waveforms of the magnetic resistance element 7 and the magnetic resistance element 8. In S2, on the basis of the two output waveforms, the detection portion 9a computes and thereby detects a detection angle θ by a method shown in Japanese Patent Application Publication No. 2007-127609 (JP-A-2007-127609).

Subsequently in S3, the correction portion 9b of the microcomputer 9 determines whether or not the detection angle θ has increased to the maximum value θmax. If the determination is affirmative, the process proceeds to S4. On the other hand, if the determination is negative, the process proceeds to S8. In S4, the correction portion 9b determines whether or not the detection angle θ decreases to the minimum value θmin before the predetermined time ΔT elapses after S3. If the determination is affirmative, the process proceeds to S5. If the determination is negative, the process returns to S1.

In S5, the correction portion 9b performs the addition process of adding the value θall obtained by subtracting the minimum value θmin from the maximum value θmax to the detection angle θ occurring at a rotation angle θr that is larger than the rotation angle θr occurring when the detection angle θ is the maximum value θmax, and the notification portion 9d notifies the EPSECU that a mis-mounting has occurred. In S6, the correction portion 9b determines whether or not the detection angle θ has decreased to the minimum value θmin. If the determination is affirmative, the process proceeds to S7. If the determination is negative, the process returns to S5. In S7, the correction portion 9b determines whether or not the detection angle θ increases to the maximum value θmax before the predetermined time ΔT elapses after S6. If the determination is affirmative, the process ends. If the determination is negative, the process returns to S5.

In S8, subsequently to the negative determination in S3, the correction portion 9b of the microcomputer 9 determines whether or not the detection angle θ has decreased to the minimum value θmin. If the determination is affirmative, the process proceeds to S9. If the determination is negative, the process returns to S1. In S9, the correction portion 9b determines whether or not the detection angle θ increases to the maximum value θmax before the predetermined time ΔT elapses after S8. If determination is affirmative, the process proceeds to S10. If the determination is negative, the process returns to S1.

In S10, the correction portion 9b performs the subtraction process of subtracting the value θall obtained by subtracting the minimum value θmin from the maximum value θmax, from the detection angle θ occurring at a rotation angle θr that is smaller than the rotation angle θr occurring when the detection angle θ is the minimum value θmin, and the notification portion 9d notifies the EPSECU that a mis-mounting has occurred. In S11, the correction portion 9b determines whether or not the detection angle θ has increased to the maximum value θmax. If the determination is affirmative, the process proceeds to S12. If the determination is negative, the process returns to S10.

In S12, the correction portion 9b determines whether or not the detection angle θ decreases to the minimum value θmin before the predetermined time ΔT elapses after S11. If the determination is affirmative, the process ends. If the determination is negative, the process returns to S10.

Incidentally, when S5 is executed, the output portion 9c of the microcomputer 9 outputs a post-addition process detection angle θa, that is, a post-correction detection angle θa, to the EPSECU. When S10 is executed, the output portion 9c outputs a post-subtraction process detection angle θa, that is, a post-correction detection angle θa, to the EPSECU. In the other cases, the output portion 9c outputs to the EPSECU the detection angle θ that is not corrected.

Besides, the processes at S1 to S12 are executed by one of the detection portion 9a, the correction portion 9b, the output portion 9c, and the notification portion 9d of the microcomputer 9 in the foregoing procedure at every predetermined computation period.

Figure 4:
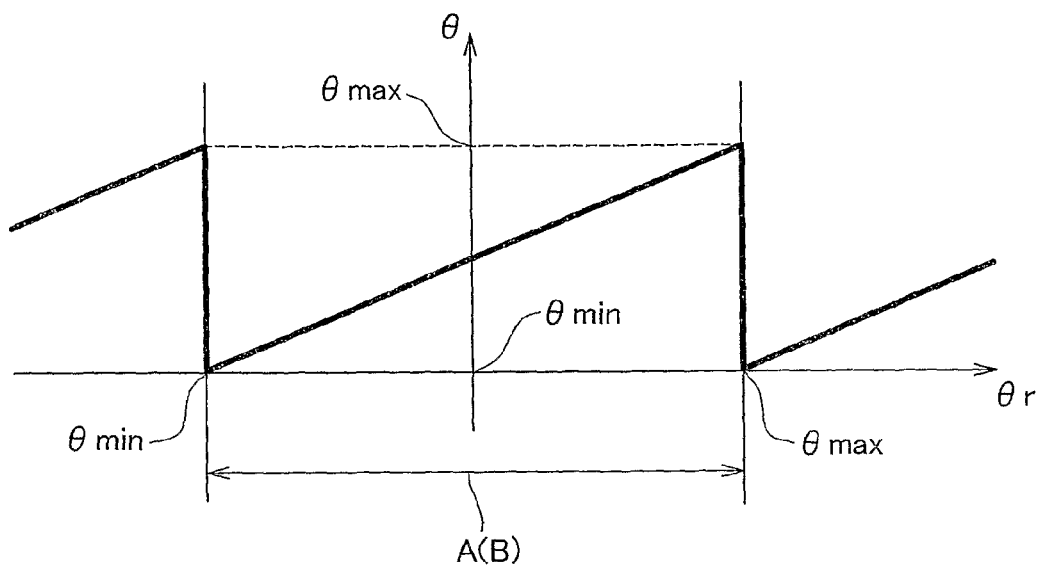
FIG. 4 is a schematic diagram showing a relation between the detection angle detected by the rotation angle detection device in accordance with an embodiment of the invention and the rotation angle.
Figure 5:
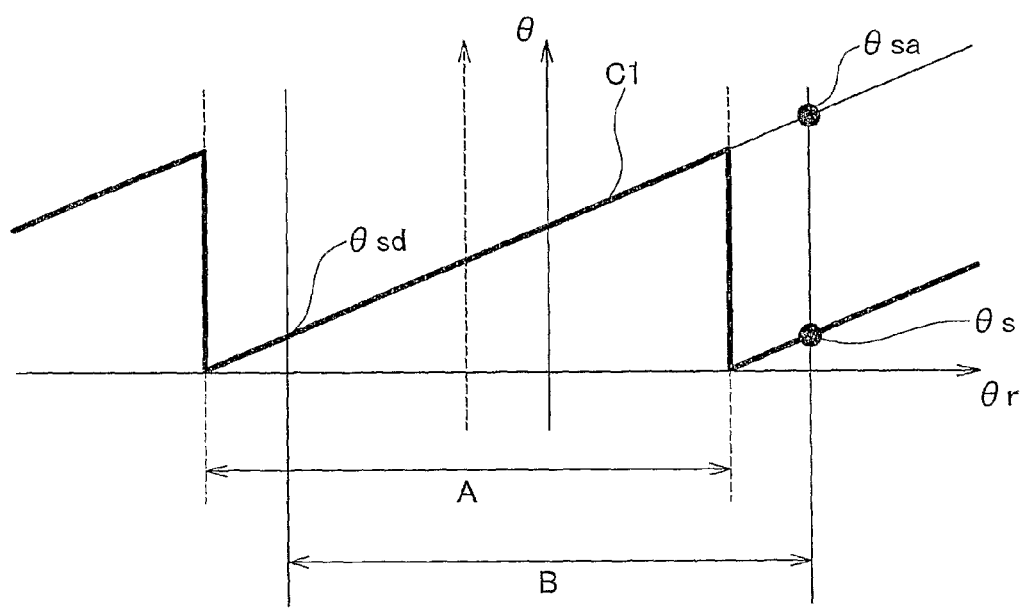
FIG. 5 is a schematic diagram showing the fashion of a deviation of the rotation range of the rotation angle detection device in accordance with an embodiment of the invention from the unit range to an increase side.

According to the foregoing rotation angle detection device 1 of the embodiment, the following operation and effects can be achieved. That is, in the case where the detection angle θ decreases to the minimum value θmin immediately after increasing to the maximum value θmax although the rotation range of the column main shaft is set within a unit range, it can be considered that the rotation range of the column main shaft is deviated from or is offset from the unit range to the increase side. This will be described with reference to the drawings. FIG. 4 is a schematic diagram showing a relation between the detection angle provided by the rotation angle detection device 1 and the rotation angle in accordance with the embodiment. FIG. 5 is a schematic diagram showing a fashion in which the rotation range of the rotation angle detection device 1 in accordance with the embodiment is deviated from the unit range to the increase side.

That is, in the case where there is no occurrence of mis-mounting, the rotation range B is contained in the unit range A, and the zero point of the rotation angle θr coincides with the zero point of the detection angle θ as shown in FIG. 4. However, in the case where the rotation range B of the column main shaft is offset or deviated from the unit range A to the increase side as shown in FIG. 5, if a driver turns the steering wheel rightward to the full rotation angle θr of the column main shaft in the rightward direction, the detection angle θ sharply changes to the minimum value θmin after reaching the maximum value θmax.

If this state is left as it is, the value of the detection angle θs at the end of a portion of the rotation range B that extends out from the unit range A to the increase side is equal to the detection angle θsd at the extreme decrease-side end of the rotation range B, which means that two equal detection angles θs, θsd occur in the rotation range B, so that the detection angle θ that univocally corresponds to the rotation angle θr cannot be detected.

In this case, a process of adding the value θall obtained by subtracting the minimum value θmin from the maximum value θmax to the detection angle θ detected after the decrease from the maximum value θmax to the minimum value θmin is performed by the correction portion 9b. After that, the output portion 9c outputs to the EPSECU the detection angle θa that has been subjected to the addition process. Therefore, the detection angle θs in the portion of the rotation range B that extends out from the unit range A to the increase side is corrected to θS+θall=θsa, so as to agree with the linear characteristic of a portion of the characteristic curve that does not extend out from the unit range A to the increase side, that is, a straight line portion C1.

Because of this, the detection angle θ univocally corresponding to the rotation angle θr can be detected over the entire rotation range B. Therefore, even in the case where there is mis-mounting, the rotation angle detection device 1 can be used without a need to perform the mounting operation again. This will simplify the production processes, and will reduce the production cost.

Besides, in the case where the addition process is performed, the notification portion 9d of the microcomputer 9 notifies the EPSECU of the occurrence of mis-mounting. Due to this, the EPSECU can detect the occurrence of mis-mounting, and can make an appropriate correction, without waiting for the off/on timing of the ignition key.

Figure 6:
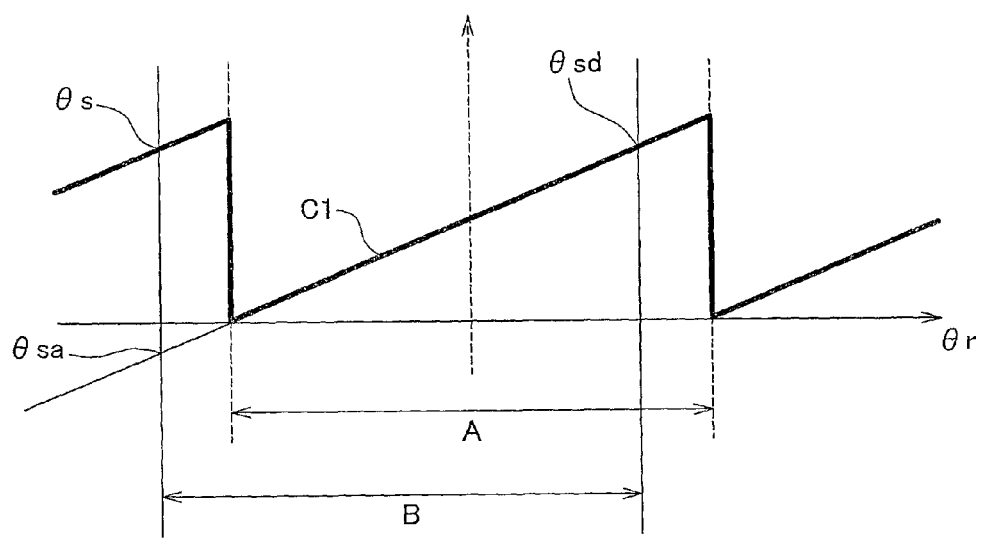
FIG. 6 is a schematic diagram showing the fashion of a deviation of the rotation range of the rotation angle detection device in accordance with the embodiment of the invention from the unit range to a decrease side.

Likewise, in the case where the detection angle θ increases to the maximum value θmax immediately after decreasing to the minimum value θmin despite the setting of the rotation range of the column main shaft within the unit range, it can be considered that there is a mis-mounting such that the rotation range of the column main shaft is offset or deviated from the unit range to the decrease side. This will also be described with reference to the drawings. FIG. 6 is a schematic diagram showing the fashion of a deviation of the rotation range of the rotation angle detection device in accordance with the embodiment from the unit range to the decrease side.

That is, in the case where there is no occurrence of mis-mounting, the rotation range B is contained in the unit range A, and the zero points of the rotation angle θr and the detection angle θ coincide with each other. In the case where the rotation range B of the column main shaft is deviated from the unit range A to the decrease side as shown in FIG. 6, if a driver turns the steering wheel leftward to the full rotation angle θr of the column main shaft in the leftward direction, the detection angle θ sharply changes to the maximum value θmax after reaching the minimum value θmin.

If this state is left as it is, the value of the detection angle θs at the end of a portion of the rotation range B that extends out from the unit range A to the decrease side is equal to the detection angle θsd at the extreme increase-side end of the rotation range B. Hence, two equal detection angles θs, θsd occur in the rotation range B, so that the detection angle θ that univocally corresponds to the rotation angle θr cannot be detected.

In this case, too, a process of subtracting the value θall obtained by subtracting the minimum value θmin from the maximum value θmax, from the detection angle θ detected after the increase from the minimum value θmin to the maximum value θmax is performed by the correction portion 9b. After that, the output portion 9c outputs to the EPSECU the detection angle θa that has been subjected to the subtraction process. Therefore, the detection angle θs in the portion of the rotation range B that extends out from the unit range A to the decrease side is corrected to θs−θall=θsa, so as to agree with the linear characteristic of a portion of the characteristic curve that does not extend out from the unit range A to the decrease side, that is, a straight line portion C1.

Because of this, the detection angle θ univocally corresponding to the rotation angle θr can be detected over the entire rotation range B. Therefore, even in the case where there is mis-mounting, the rotation angle detection device 1 can be used without a need to perform the mounting operation again. This will simplify the production processes, and will reduce the production cost.

Besides, in the case where the subtraction process is performed, the notification portion 9d of the microcomputer 9 notifies the EPSECU of the occurrence of mis-mounting. Due to this, the EPSECU can detect the occurrence of mis-mounting, and can make an appropriate correction, without waiting for the off/on timing of the ignition key.

Furthermore, as a technique of coping with the mis-mounting as described above, it is conceivable that the number m of teeth of the detecting gear 3 and the number L of teeth of the detecting gear 4 are made greatly different from each other so that the unit range A is a broad range given an increased margin with respect to the rotation range B. In this case, one of the two detecting gears 3 and 4 needs to have a larger outside diameter than in the foregoing construction. This will bring about an increased weight of the rotation angle detection device 1 as a whole, enlarged outside dimensions, and an increased cost.

However, according to the rotation angle detection device 1 of this embodiment, correction as described above can be made merely by changing a logic in a device that is capable of detecting a relatively wide unit range of rotation angle, for example, having a range width of about 1440 degrees to about 2160 degrees. Due to this correction, even in the case where mis-mounting occurs, the detection angle θ that univocally corresponds to the rotation angle θr in the rotation range B can be detected. Hence, the rotation angle detection device 1 of this embodiment can eliminate the need to change the numbers m and L of teeth of the detecting gears 3 and 4, and therefore can substantially avoid bringing about an increased weight, enlarged outside dimensions, or an increased cost of the rotation angle detection device 1.

While the embodiment of the invention has been described in detail above, the invention is not restricted by the foregoing embodiment or constructions, but various modifications and replacements can be made on the foregoing embodiment without departing from the scope of the invention.

The invention relates to a rotation angle detection device that is suitable in the application to vehicles, and is able to eliminate the need to perform the mounting operation again when mis-mounting occurs, and therefore is able to allow a sufficient cost reduction, and is able to univocally detect the detection angle that corresponds to the rotation angle.

Therefore, the invention may be applied to not only steering devices but also various other device that have a rotating body in various vehicles such as passenger automobiles, trucks, buses. The various devices include power window devices, sunroof devices, seat moving devices, etc., as well as steering devices.

The invention claimed is:
1. A rotation angle detection device comprising:
a detection portion that detects a detection angle that univocally corresponds to a rotation angle of a rotating body, within every unit range, wherein as the rotation angle increases, the detection angle linearly increases from a minimum value to a maximum value within the unit range, and as the rotation angle increases, the detection angle changes from the maximum value to the minimum value at a boundary between the unit range and an adjacent unit range on an increase side of the unit range, and wherein a rotation range of the rotating body is set within the unit range; and a correction portion that starts an addition process of adding to the detection angle a value obtained by subtracting the minimum value from the maximum value, if the detection angle decreases to the minimum value immediately after increasing to the maximum value, due to deviation of the rotation range from the unit range to the increase side.

2. The rotation angle detection device according to claim 1, wherein the correction portion ends the addition process if the detection angle increases to the maximum value immediately after decreasing to the minimum value.

3. The rotation angle detection device according to claim 2, further comprising: a notification portion that notifies that mis-mounting has occurred, if the correction portion starts the addition process.

4. A rotation angle detection device comprising:
a detection portion that detects a detection angle that univocally corresponds to a rotation angle of a rotating body, within every unit range, wherein as the rotation angle decreases, the detection angle linearly decreases from a maximum value to a minimum value within the unit range, and as the rotation angle decreases, the detection angle changes from the minimum value to the maximum value at a boundary between the unit range and an adjacent unit range on a decrease side of the unit range, and wherein a rotation range of the rotating body is set within the unit range; and a correction portion that starts a subtraction process of subtracting from the detection angle a value obtained by subtracting the minimum value from the maximum value, if the detection angle increases to the maximum value immediately after decreasing to the minimum value, due to deviation of the rotation range from the unit range to the decrease side.

5. The rotation angle detection device according to claim 4, wherein the correction portion ends the subtraction process if the detection angle decreases to the minimum value immediately after increasing to the maximum value.

6. The rotation angle detection device according to claim 5, further comprising: a notification portion that notifies that mis-mounting has occurred, if the correction portion starts the subtraction process.

7. A rotation angle detection method comprising:
detecting a detection angle that univocally corresponds to a rotation angle of a rotating body within every unit range, wherein as the rotation angle increases, the detection angle linearly increases from a minimum value to a maximum value within the unit range, and as the rotation angle increases, the detection angle changes from the maximum value to the minimum value at a boundary between the unit range and an adjacent unit range on an increase side of the unit range, and wherein a rotation range of the rotating body range is set within the unit range; and correcting the detection angle by adding to the detection angle a value obtained by subtracting the minimum value from the maximum value, if the detection angle decreases to the minimum value immediately after increasing to the maximum value, due to deviation of the rotation range from the unit range to the increase side.

8. A rotation angle detection method comprising:
detecting a detection angle that univocally corresponds to a rotation angle of a rotating body, within every unit range, wherein as the rotation angle decreases, the detection angle linearly decreases from a maximum value to a minimum value within the unit range, and as the rotation angle decreases, the detection angle changes from the minimum value to the maximum rotation angle decreases, the detection angle changes from the minimum value to the maximum value at a boundary between the unit range and an adjacent unit range on a decrease side of the unit range, and wherein a rotation range of the rotating body is set within the unit range; and correcting the detection angle by subtracting from the detection angle a value obtained by subtracting the minimum value from the maximum value, if the detection angle increases to the maximum value immediately after decreasing to the minimum value, due to deviation of the rotation range from the unit range to the decrease side.

\* \* \* \* \*